F. E. GLOVER.
WRENCH.
APPLICATION FILED AUG. 28, 1912.

1,055,899.                                         Patented Mar. 11, 1913.

Witnesses

Inventor
Frank E. Glover
By Victor J. Evans
Attorney

UNITED STATES PATENT OFFICE.

FRANK E. GLOVER, OF ROUSEVILLE, PENNSYLVANIA.

WRENCH.

1,055,899.

Specification of Letters Patent. Patented Mar. 11, 1913.

Application filed August 28, 1912. Serial No. 717,548.

*To all whom it may concern:*

Be it known that I, FRANK E. GLOVER, a citizen of the United States, residing at Rouseville, in the county of Venango and State of Pennsylvania, have invented new and useful Improvements in Wrenches, of which the following is a specification.

The general object of this invention is the provision of a wrench so constructed as to render the same easily and quickly adjustable; and to this end the invention consists in certain novel constructions, arrangements and combinations of devices which will be hereinafter described and then pointed out in the appended claims.

In carrying out the object of the invention generally stated above, it will be understood, of course, that the essential features thereof are susceptible to changes in details and structural arrangements, one preferred and practical embodiment being shown in the accompanying drawing, wherein—

Figure 1:
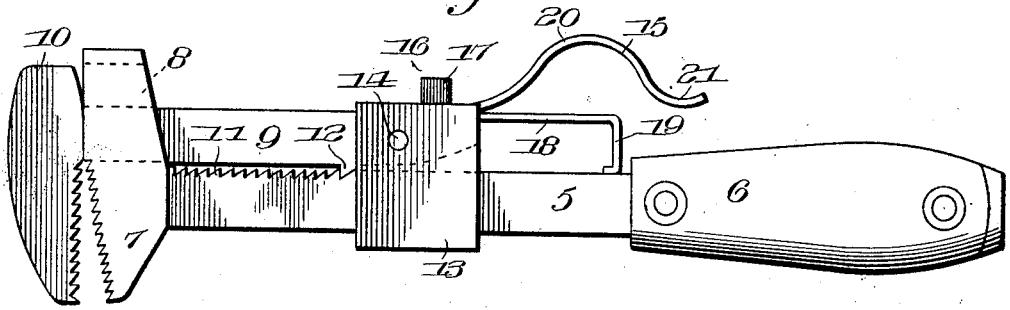
Figure 2:
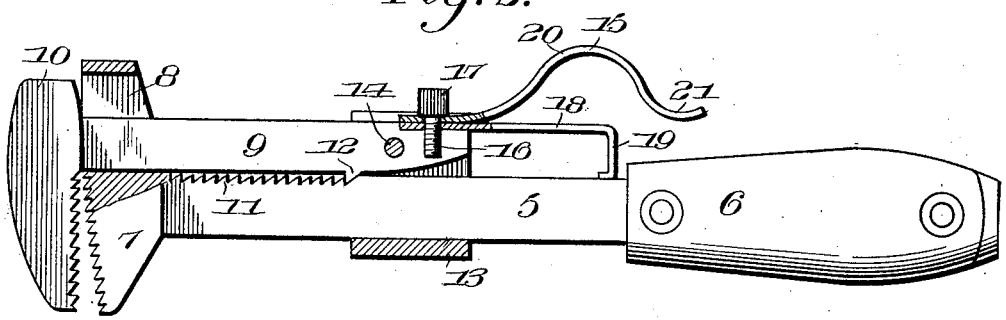
Figure 3:
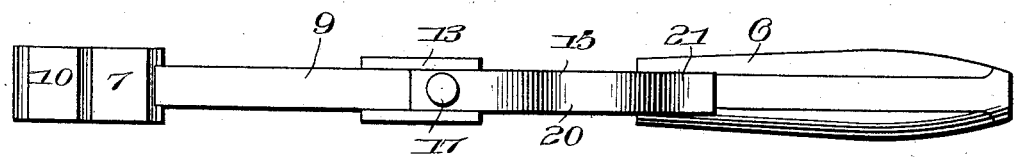

Figure 1 is a side elevation of the wrench constructed in accordance with the invention. Fig. 2 is a vertical longitudinal partly sectional view of the same. Fig. 3 is an edge elevation thereof.

Referring more particularly to the accompanying drawing in which like reference characters designate similar parts, it will be seen that the invention comprises a shank 5 having a handle 6 on one end thereof and a stationary jaw 7 at its other end, said jaw being provided with a longitudinal opening 8 rearwardly of said shank adapted to receive the shank 9 of the movable jaw 10. The opposed faces of the shank 5 and shank 9 are provided with beveled teeth 11 and 12 which are adapted to interlock and prevent movement of the movable jaw 10 in one direction when the parts are in normal relation.

Embracing the shank 5 is a frame 13 of U-shaped formation in cross-section and pivotally mounted in the frame, by means of the pivot pin 14 is one end of the shank 9. The outer longitudinal edge of the shank 9 has secured thereto one end of an operating lever 15 by means of a set screw 16 having a milled head 17. Interposed between the fixed end of the lever 15 and the shank 9 is a substantially L-shaped leaf spring 18 which extends longitudinally of the shank 5, the short extension 19 of the said spring being adapted to engage said shank whereby the teeth 11 and 12 will be normally maintained in interlocking relation. Intermediate the ends of the lever 15 the same is provided with an arcuate portion 20 which terminates in a finger rest 21. It will thus be seen that by grasping the handle 6 in the hand and pressing inwardly upon the finger rest 21 with the thumb, the inner end of the shank 9 will be forced inwardly toward the shank 5 by reason of said shank 9 being pivoted in the frame 13 thus throwing the teeth 11 and 12 out of engagement with each other and permitting the movable jaw 10 to be moved outwardly by exerting a slight forward pressure upon the arcuate portion 20 of the operating lever. Upon releasing the thumb from the operating lever, the teeth 11 and 12 will again be interlocked by reason of the tension of the leaf spring 18, the same being adapted to cause the shank 9 to move back to its normal position. It will also be seen that by reason of the arrangement of the teeth 11 and 12, the jaw 10 may at all times be moved inwardly by engaging the thumb over the arcuate portion 20 and exerting a slight inward pressure toward the handle 6.

From the foregoing description taken in connection with the accompanying drawing, it will be seen that the invention contemplates providing a wrench which is simple in construction, thus reducing the cost of manufacture of the same to a minimum, and which is durable and effective in carrying out the purpose for which it is designed.

What is claimed is:—

1. A wrench comprising a shank having a stationary jaw thereon, a movable jaw having a shank adapted to interlock with the shank of the stationary jaw, the stationary jaw being formed with a loop to receive the shank of the movable jaw, a frame embracing said stationary jaw shank, means for pivotally mounting the movable jaw shank in said frame, a substantially L-shaped leaf spring secured to the inner end of said movable jaw shank and engaging the fixed jaw shank to normally maintain said shanks in interlocked relation.

2. A wrench comprising a shank having a stationary jaw formed thereon, a movable jaw having a shank adapted to interlock with the stationary jaw shank, the stationary jaw being formed with a loop to receive the shank of the movable jaw, a frame embracing said stationary jaw shank, means for pivoting said movable jaw shank in said frame, means secured to the inner end of said movable jaw shank and engaging said stationary jaw shank for normally retaining said shanks in interlocking relation, and an operating lever secured to the inner end of the movable jaw shank to force the latter and said stationary jaw shank out of interlocking engagement to permit independent relative movement of the movable jaw.

3. A wrench comprising a shank having a stationary jaw formed thereon, a movable jaw having a shank, the stationary jaw being formed with a loop to receive the shank of the movable jaw, means carried by the shanks for interlocking said shanks to secure the jaws against independent movement, a frame embracing the stationary jaw shank, means for pivoting the movable jaw shank in said frame, a spring secured to the inner end of the movable jaw shank and engaging the stationary jaw shank to normally retain said shanks in interlocked relation, an operating lever secured to the inner end of the movable jaw shank and adapted in operation to force said shank out of interlocking engagement with the stationary jaw shank.

In testimony whereof I affix my signature in presence of two witnesses.

FRANK E. GLOVER.

Witnesses:
 ALBERT D. WRIGHT,
 WM. G. MCQUISTON.

Copies of this patent may be obtained for five cents each, by addressing the "Commissioner of Patents, Washington, D. C."